United States Patent
Kudou et al.

(10) Patent No.: US 8,068,297 B2
(45) Date of Patent: Nov. 29, 2011

(54) DIOXAZINE SULFAMOYL COMPOUND, COLORING POWDER COMPOSITION FOR COLOR FILTER, AND COLOR FILTER

(75) Inventors: Arata Kudou, Narita (JP); Seiji Funakura, Narita (JP); Hitoshi Kondou, Chiba (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 12/452,829

(22) PCT Filed: Jul. 14, 2008

(86) PCT No.: PCT/JP2008/062665
§ 371 (c)(1),
(2), (4) Date: Jan. 25, 2010

(87) PCT Pub. No.: WO2009/016945
PCT Pub. Date: Feb. 5, 2009

(65) Prior Publication Data
US 2010/0128375 A1  May 27, 2010

(30) Foreign Application Priority Data

Jul. 31, 2007 (JP) .................................. 2007-198914
Mar. 10, 2008 (JP) .................................. 2008-059279

(51) Int. Cl.
  G02B 5/22 (2006.01)
  C08K 5/00 (2006.01)
  C09B 67/50 (2006.01)
(52) U.S. Cl. ......... 359/885; 252/586; 406/413; 406/494
(58) Field of Classification Search .................. 252/586; 359/885; 430/7, 517, 270.1; 349/106; 428/1.31; 106/413, 494
See application file for complete search history.

(56) References Cited

U.S. PATENT DOCUMENTS

2002/0068772 A1  6/2002  Laksin et al.

FOREIGN PATENT DOCUMENTS

| DE | 3889305 T2 | 9/1994 |
|---|---|---|
| DE | 69514415 T2 | 8/2000 |
| JP | 02-102272 A | 4/1990 |
| JP | 02-102273 A | 4/1990 |
| JP | 05-505412 | 8/1993 |
| JP | 07-331101 A | 12/1995 |
| JP | 2003-504480 | 2/2003 |
| JP | 2003-531223 | 10/2003 |
| JP | 2005-173459 A | 6/2005 |
| JP | 2006-052410 A | 2/2006 |
| JP | 2006-274003 A | 10/2006 |
| JP | 2006-274004 A | 10/2006 |
| WO | WO-91/14744 A1 | 10/1991 |
| WO | WO-01/04215 A2 | 1/2001 |
| WO | WO-2009/016945 A1 | 2/2009 |

OTHER PUBLICATIONS

Office Action issued on related Japanese Patent Application No. 2008-550571 and English translation thereof.
International Search Report dated Oct. 7, 2008, issued on PCT/JP2008/062665.
Office Action dated Feb. 24, 2011, issued for the German Patent Application No. 112008002011.6.

*Primary Examiner* — Ling Choi
*Assistant Examiner* — Bijan Ahvazi
(74) *Attorney, Agent, or Firm* — Edwards Angell Palmer & Dodge LLP

(57) ABSTRACT

The present invention relates to a pigment composition or pigment dispersion that is ideal for producing the blue pixel portion of a color filter for a liquid crystal display device, and a color filter. The invention has an object of providing a color filter having a blue pixel portion that yields a liquid crystal display device having a high degree of contrast that enables the display screen to be viewed with improved clarity, and a high level of brightness that produces a brighter display screen, as well as providing a pigment composition or dispersion that can be used to produce the color filter. The above object can be realized by using a dioxazine derivative that is substituted with a sulfamoyl group having a specific polyalkylene oxide group, and a pigment composition or dispersion for a color filter that includes this dioxazine derivative and a blue organic pigment or violet organic pigment.

15 Claims, 8 Drawing Sheets

DIOXAZINE SULFAMOYL COMPOUND, COLORING POWDER COMPOSITION FOR COLOR FILTER, AND COLOR FILTER

TECHNICAL FIELD

The present invention relates to a coloring powder composition that is ideal in fabricating the blue pixel portion of a color filter for a liquid crystal display device, a pigment dispersion for a color filter prepared by dispersing the coloring powder composition in a medium, and a color filter prepared by using the dispersion for the blue pixel portion.

BACKGROUND ART

Known coloring materials that use violet pigment dioxazine derivatives similar to the present invention include the materials described below.

Patent Document 1 reports that a blue pigment dispersion including, as essential components, a dioxazine sulfonic acid derivative different from the polyoxyalkylene sulfamoyl compound of the present invention and a cationic comb-shaped graft polymer is able to be finely dispersed and exhibits a large Newtonian flow property. However, when a blue pigment obtained using this method is used for a color filter, the required values for the required brightness, the contrast, and the transmittance haze and the like tend to be unsatisfactory, and the targeted levels are unable to be reached.

Patent Document 2 reports that a polyoxyalkylene-modified phthalocyanine-based colorant is useful as a colorant for thermosetting resins and polyolefin-based materials. In this document, the colorant is used for a UV ink, which differs from the use within a color filter described in the present invention. Further, although example 2 describes a dioxazine violet pigment, the dispersant used is a copper phthalocyanine polyoxyalkylene sulfamoyl compound, and differs from the dioxazine sulfamoyl compound of the present invention.

A color filter for a liquid crystal display device includes a red pixel portion, a green pixel portion and a blue pixel portion. Each of these pixel portions has a structure in which a thin film of a synthetic resin containing a dispersed organic pigment is provided on a substrate, wherein red, green and blue organic pigments are used as the organic pigments.

Of these pixel portions, the blue organic pigment used for forming the blue pixel portion generally uses an ε-type copper phthalocyanine pigment (C.I. Pigment Blue 15:6), and if necessary, this pigment may be combined with a small amount of a dioxazine violet organic pigment (C.I. Pigment Violet 23) to regulate the hue.

Organic pigments used in fabricating color filters require completely different properties from pigments used in conventional general-purpose applications, and specifically, require properties that enable the display screen of the liquid crystal display device to be seen clearly (namely, high contrast), or enable the display screen to appear brighter (namely, high brightness). In order to satisfy these types of requirements, finely powdered organic pigments with an average primary particle size of not more than 100 nm are widely used, but color resist inks prepared using finely powdered organic pigments still suffer from problems of fluidity and light transmittance that need to be addressed. For example, when used as an ink for a color filter for a liquid crystal display, problems such as coating irregularities caused by a deterioration in the Newtonian flow property of the ink during spin coating onto the glass substrate, and inadequate light transmittance following pixel formation that results in unsatisfactory levels of brightness and contrast for the filter are drawbacks that remain unresolved.

As described above, the coloring powder composition for a color filter containing a dioxazine sulfamoyl derivative according to the present invention has been unknown until now, and moreover, a pigment dispersion for a color filter prepared by dispersing the coloring powder composition in a medium, and a color filter prepared by using the dispersion for a blue pixel portion have also not been known until now.

[Patent Document 1]

Japanese Unexamined Patent Application, First Publication No. 2006-52410

[Patent Document 2]

Published Japanese Translation No. 2003-531223 of PCT

DISCLOSURE OF INVENTION

Problems to be Solved by the Invention

The present invention has an object of providing a coloring powder composition for a color filter containing a novel dioxazine sulfamoyl compound that is useful as a coloring material, and also has an object of providing a color filter having a blue pixel portion which yields a liquid crystal display device having a high degree of contrast that enables the display screen to be viewed with improved clarity, and a high level of brightness that produces a brighter display screen.

Further, the present invention also has an object of providing a novel dioxazine sulfamoyl compound capable of achieving the above objects.

Means to Solve the Problems

The inventors of the present invention synthesized numerous dioxazine sulfamoyl compounds in an attempt to provide a coloring powder composition that could be used favorably within a color filter, and then investigated the properties of either:

(1) a coloring powder composition for a color filter containing the dioxazine sulfamoyl compound (A), or (2) a coloring powder composition for a color filter containing the dioxazine sulfamoyl compound (A), and further containing a blue organic pigment (B) or a violet organic pigment (C).

As a result, the inventors discovered that a dioxazine sulfamoyl compound having a specific structure was extremely useful in preparing a coloring powder composition that could be used favorably within a color filter, a pigment dispersion for a color filter obtained by dispersing the coloring powder composition in a medium, and a color filter produced by using the dispersion within a blue pixel portion, and they were therefore able to complete the present invention.

In other words, the present invention achieves the above objects by providing a coloring powder composition for a color filter containing a dioxazine sulfamoyl compound (A) represented by general formula (1) shown below:

[Chemical Formula 1]

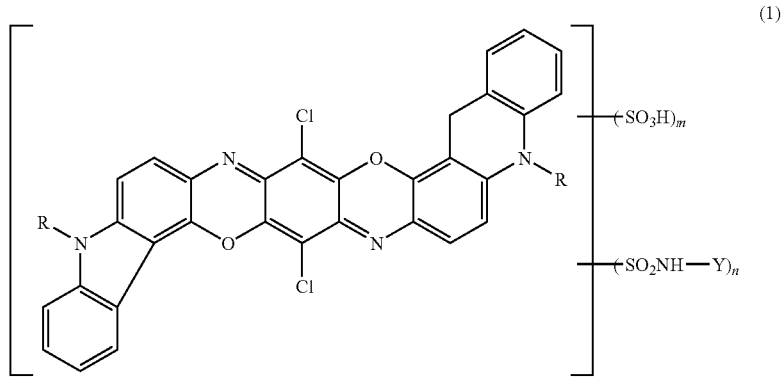

wherein R represents an alkyl group of 1 to 4 carbon atoms, m represents an integer of 0 to 3 and n represents an integer of 1 to 4, provided that m+n=1 to 4, and Y represents a group represented by general formula (2) shown below:

[Chemical Formula 2]

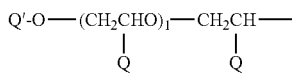
(2)

wherein l represents an integer of 4 to 100, each Q independently represents a hydrogen atom or a methyl group, and Q' represents an alkyl group of 1 to 6 carbon atoms, as well as providing a pigment dispersion for a color filter produced by dispersing the above coloring powder composition in a medium, a color filter produced by using the dispersion within a blue pixel portion, and a dioxazine sulfamoyl compound represented by general formula (1) shown below:

[Chemical Formula 3]

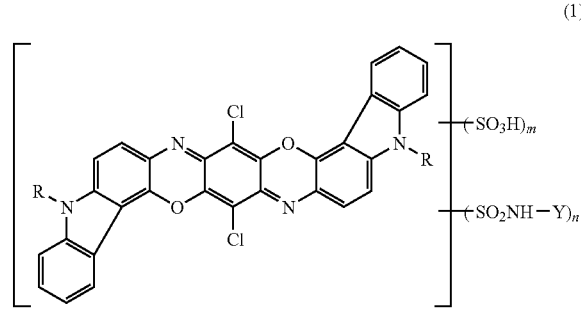
(1)

wherein R represents an alkyl group of 1 to 4 carbon atoms, m represents an integer of 1 to 3 and n represents an integer of 1 to 3, provided that m+n=2 to 4, and Y is a group represented by general formula (2) shown below:

[Chemical Formula 4]

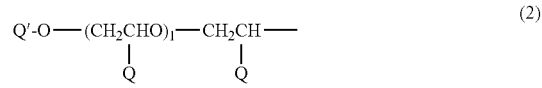
(2)

wherein l represents an integer of 4 to 100, each Q independently represents a hydrogen atom or a methyl group, and Q' represents an alkyl group of 1 to 6 carbon atoms.

Effect of the Invention

The present invention is able to provide a coloring powder composition for a color filter containing a dioxazine sulfamoyl compound, a color filter having a blue pixel portion which contains the dioxazine sulfamoyl compound and yields a liquid crystal display device having a high degree of contrast that enables the display screen to be viewed with improved clarity, and a high level of brightness that produces a brighter display screen, and a novel dioxazine sulfamoyl compound that can be used within the above coloring powder composition for a color filter.

BEST MODE FOR CARRYING OUT THE INVENTION

The present invention provides a coloring powder composition for a color filter which either contains a dioxazine sulfamoyl compound (A) represented by general formula (1) shown below:

[Chemical Formula 5]

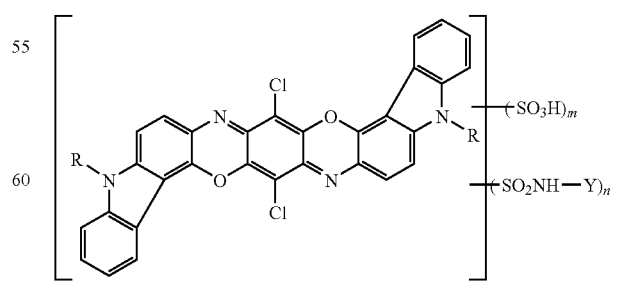
(1)

wherein R represents an alkyl group of 1 to 4 carbon atoms, m represents an integer of 0 to 3 and n represents an integer of 1 to 4, provided that m+n=1 to 4, and Y represents a group represented by general formula (2) shown below:

[Chemical Formula 6]

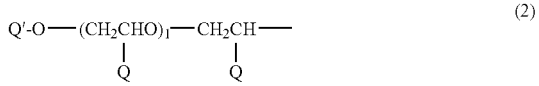

(2)

wherein l represents an integer of 4 to 100, each Q independently represents a hydrogen atom or a methyl group, and Q' represents an alkyl group of 1 to 6 carbon atoms, or contains the dioxazine sulfamoyl compound (A), and further contains a blue organic pigment (B) or a violet organic pigment (C), and also provides a pigment dispersion for a color filter produced by dispersing the coloring powder composition in a medium, and a color filter produced by using the dispersion within a blue pixel portion.

Examples of the dioxazine sulfamoyl compound (A) used in the coloring powder composition of the present invention, namely, the dioxazine sulfamoyl compound represented by general formula (1) shown below:

[Chemical Formula 7]

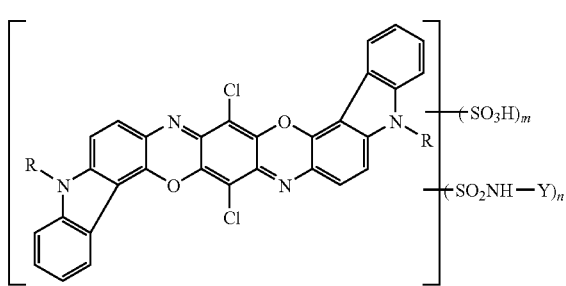

(1)

wherein R represents an alkyl group of 1 to 4 carbon atoms, m represents an integer of 0 to 3 and n represents an integer of 1 to 4, provided that m+n=1 to 4, and Y represents a group represented by general formula (2) shown below:

[Chemical Formula 8]

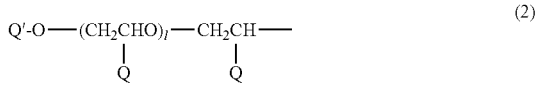

(2)

wherein l represents an integer of 4 to 100, each Q independently represents a hydrogen atom or a methyl group, and Q' represents an alkyl group of 1 to 6 carbon atoms, include compounds in which the dioxazine ring that is substituted with a sulfonic acid group or a sulfamoyl group may or may not be substituted with a sulfonic acid group, is preferably not substituted with a sulfonic acid group (if substituted, then m values of 3 or less are preferred), but is substituted with at least one sulfamoyl group. There are no particular restrictions on the number of introduced sulfamoyl groups, provided at least one sulfamoyl group is introduced per dioxazine ring, although the number of sulfamoyl groups is preferably either 1 or 2, and is more preferably 2. There are no particular restrictions on the position of substitution, provided it is a position at which a sulfonic acid group or sulfamoyl group is able to be substituted.

Furthermore, R represents an alkyl group of 1 to 4 carbon atoms such as a methyl group, ethyl group, propyl group or butyl group, and of these, an ethyl group is particularly desirable.

The group Y in general formula (1) of the present invention represents a polyalkylene oxide portion. Y may represent any of the available polyalkylene oxides such as an ethylene oxide polymer or an ethylene oxide/propylene oxide copolymer, and may be either a block polymer or a random polymer. Y preferably represents a group represented by general formula (2) shown below:

[Chemical Formula 9]

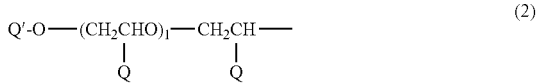

(2)

wherein l represents an integer of 4 to 100, each Q independently represents a hydrogen atom or a methyl group, and Q' represents an alkyl group of 1 to 6 carbon atoms, and the hydrophilic groups and lipophilic groups within the group Y are preferably optimized in accordance with the solvent medium used in preparing the coloring powder composition for a color filter. The alkyl group of 1 to 6 carbon atoms represented by Q' may be either a linear alkyl group or a branched alkyl group. Specific examples of the linear alkyl group include a methyl group, ethyl group, propyl group, butyl group, pentyl group or hexyl group. Further, specific examples of the branched alkyl group include alkyl groups of 1 to 6 carbon atoms containing appropriate branching.

The number l of repeating units within the polyalkylene oxide portion is preferably not less than 4 and not more than 100, more preferably not less than 5 and not more than 80, and still more preferably not less than 10 and not more than 50. If the number l of repeating units is less than 4, then the affinity with the dispersion medium tends to be inadequate, whereas if the number l exceeds 100, the dispersion stability tends to deteriorate.

The dioxazine sulfamoyl compound (A) represented by general formula (1) used in the present invention can be produced by combining various conventional methods. In one example of the production method, the dioxazine sulfamoyl compound (A) is produced by sulfonating a dioxazine ring and then converting a portion of the sulfonic acid groups to sulfonyl chloride, or alternatively, sulfochlorinating the dioxazine ring directly, and subsequently reacting the sulfonyl chloride with a polyether amine having an amine group at the terminal of the main chain of a polyether (hereafter abbreviated as a "polyether monoamine"). The dioxazine sulfonyl chloride that functions as one of the raw materials can be obtained by a reaction between dioxazine and chlorosulfonic acid and/or thionyl chloride. The polyether monoamine that functions as the other raw material can be obtained by reductively aminating the hydroxyl group at the terminal of a polyether structure using a nickel/copper/chromium catalyst. Polyether monoamines are available as commercial products, and an example is the JEFFAMINE (a registered trademark) M series of products available from Huntsman Corporation, U.S.A.

An example of the dioxazine sulfamoyl compound (A) represented by general formula (1) used in the present invention is the dioxazine sulfamoyl compound (3) shown below (a compound of general formula (1) in which R=$C_2H_5$, m=0 and n=2), although the present invention is not limited to this particular compound, and the most appropriate dioxazine sulfamoyl compound for preparing a coloring powder composition capable of achieving the objects of the present invention may be selected.

[Chemical Formula 10]

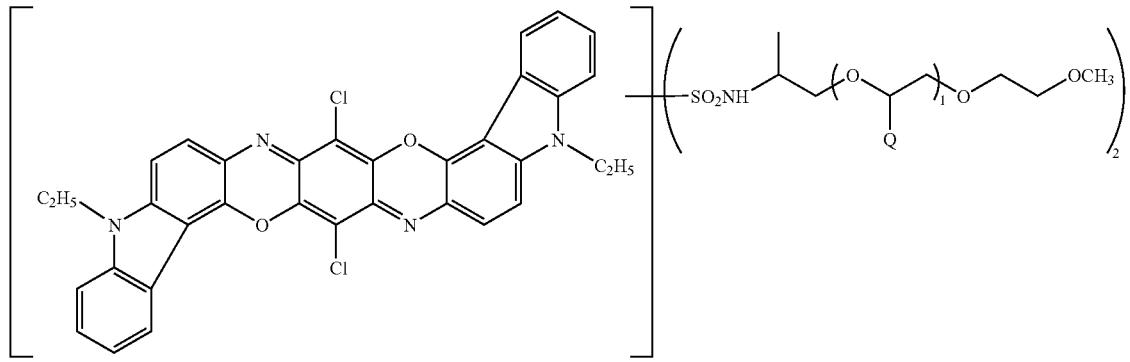

(3)

wherein Q represents a hydrogen atom or a methyl group, and l has an average value of 35.

The blue organic pigment (B) used in the present invention can use a phthalocyanine pigment or an indanthrone blue pigment. As the phthalocyanine pigment, copper phthalocyanine, metal-free phthalocyanine, zinc phthalocyanine, cobalt phthalocyanine, nickel phthalocyanine and iron phthalocyanine and the like may be used, although from a hue perspective, copper phthalocyanine is preferred.

Further, the above phthalocyanine pigment has a crystalline form, is preferably an ε-type phthalocyanine, and is most preferably an ε-type copper phthalocyanine.

Furthermore, a violet organic pigment (C) may be used in combination to impart a red tinge. Examples of the violet organic pigment (C) include the dioxazine pigments C.I. Pigment Violet 23 and 37, and C.I. Pigment Blue 80.

In those cases where the coloring powder composition of the present invention contains both the dioxazine sulfamoyl compound (A) represented by general formula (1) and the violet organic pigment (C), although there are no particular restrictions on the mass ratio between the two components, the ratio of dioxazine sulfamoyl compound (A)/violet organic pigment (C) is typically from 5/95 to 100/0. If the amount of the dioxazine sulfamoyl compound (A) represented by general formula (1) is less than 5 parts by mass, then a favorable level of contrast cannot be expected.

Furthermore, in consideration of the color density, the amount of the violet coloring powder composition (D) composed of the dioxazine sulfamoyl compound (A) and the violet organic pigment (C) is preferably within a range from 0.1 to 200% by mass relative to the blue organic pigment (B).

The coloring powder composition obtained in the present invention is a coloring powder composition for a color filter that includes the dioxazine sulfamoyl compound (A), and may further include the blue organic pigment (B) or the violet organic pigment (C) if required. The coloring powder composition exhibits superior dispersibility within liquid media and excellent dispersion stability, the pigment particles within the coloring dispersion described below are dispersed as very fine particles, the viscosity of the resulting pigment dispersion is low, and the Newtonian flow property is stable at a high level. Accordingly, when a color filter blue pixel portion is produced, a coating film of uniform quality is formed, and a color filter having high levels of brightness, contrast and light transmittance can be obtained. In this description, the expression "pigment dispersion" describes a liquid obtained by dispersing a coloring powder composition within a medium, wherein an example of this medium is an organic solvent.

Specific examples of organic solvents that may be used include aromatic solvents such as toluene, xylene and methoxybenzene, acetate ester-based solvents such as ethyl acetate, propyl acetate, butyl acetate, propylene glycol monomethyl ether acetate, propylene glycol monoethyl ether acetate, diethylene glycol methyl ether acetate, diethylene glycol ethyl ether acetate, diethylene glycol propyl ether acetate and diethylene glycol butyl ether acetate, propionate solvents such as ethoxyethyl propionate, alcohol-based solvents such as methanol and ethanol, ether-based solvents such as butyl cellosolve, propylene glycol monomethyl ether, diethylene glycol ethyl ether and diethylene glycol dimethyl ether, ketone-based solvents such as methyl ethyl ketone, methyl isobutyl ketone and cyclohexanone, aliphatic hydrocarbon solvents such as hexane, nitrogen compound-based solvents such as N,N-dimethylformamide, γ-butyrolactam, N-methyl-2-pyrrolidone, aniline and pyridine, lactone-based solvents such as γ-butyrolactone, and carbamate esters such as a 48:52 mixture of methyl carbamate and ethyl carbamate.

Here, the term "contrast" describes the value calculated by determining the transmitted light intensity when the material undergoing measurement is sandwiched between two polarizing plates arranged such that the polarization directions are parallel, and then dividing this value by the transmitted light intensity when the material undergoing measurement is sandwiched between two polarizing plates arranged such that the polarization directions are perpendicular.

Further, although the coloring powder composition of the present invention may be used alone as the blue composition for the color filter blue pixel portion, if required, a pigment derivative may be added to improve the viscosity properties of the dispersion or ink used in forming the color filter, and to improve the dispersion stability. As this pigment derivative, conventional materials may be used, although pigment derivatives represented by general formula (4) below are preferred.

[Chemical Formula 11]

$$P\text{-}(A\text{-}Y)_n \quad (4)$$

wherein P represents a phthalocyanine, indanthrone blue or dioxazine violet residue, A represents a direct bond or a divalent linking group, Y represents a primary through tertiary amino group or a heterocycle residue, and n represents 1 to 4.

Specifically, phthalimidomethyl derivatives, sulfonic acid derivatives, N-(dialkylamino)methyl derivatives and N-(dialkylaminoalkyl) sulfamoyl derivatives of phthalocyanine, indanthrone blue and dioxazine violet are preferred. An amine such as a primary amine, secondary amine, tertiary amine, quaternary amine salt or ethylenediamine or the like is preferably added to the pigment derivative.

The coloring powder composition of the present invention can be used to form a color filter blue pixel portion via conventional methods. When producing a color filter blue pixel portion using the coloring powder composition, a pigment dispersion method is ideal.

A photolithography method is a representative example of this type of pigment dispersion method. A photolithography method involves applying a photocurable composition described below to a surface of a transparent substrate for the color filter having a black matrix provided thereon, heating and drying the composition (a prebake), performing pattern exposure by irradiating the composition with ultraviolet light through a photomask, thereby curing those portions of the photocurable composition in locations corresponding with the pixel portion, and subsequently removing the unexposed portions with a developing liquid, thereby removing the non-pixel portions and fixing the pixel portion to the transparent substrate. In this method, a pixel portion formed from a cured colored coating film of the photocurable composition is formed on the transparent substrate.

By preparing a photocurable composition for each of the colors red, green and blue, and repeating the method described above using each composition, a color filter having red, green and blue colored pixel portions at predetermined positions can be produced. The blue pixel portion can be formed using the coloring powder composition of the present invention. The photocurable compositions used for forming the red pixel portion and the green pixel portion can be prepared using conventional red pigments and green pigments.

Examples of pigments that may be used for forming the red pixel portion include C.I. Pigment Red 177, 209 and 254, whereas examples of the pigments for the green pixel portion include C.I. Pigment Green 7, 10, 36, 47 and 58. A yellow pigment may also be used in combination during formation of the red pixel portion and the green pixel portion. Subsequently, if required, the entire color filter may be subjected to a heat treatment (a postbake) to heat-cure any unreacted photocurable compounds.

Examples of the method used for applying the photocurable composition described below to the transparent substrate such as glass include spin coating methods, roll coating methods, and inkjet methods.

The drying conditions employed for the coating film of the photocurable composition applied to the transparent substrate vary depending on the nature of each of the components within the composition and their relative blend amounts, but drying is typically performed at 50 to 150° C. for a period of approximately 1 to 15 minutes. Further, the light used for the photocuring of the photocurable composition is preferably ultraviolet light having a wavelength within a range from 200 to 500 nm or visible light. Any light source capable of generating light within the above wavelength ranges may be used.

Examples of the developing method include liquid coating methods, dipping methods and spray methods. Following exposure and developing of the photocurable composition, the transparent substrate having a pixel portion of the required color formed thereon is washed with water and dried. By subjecting the color filter obtained in this manner to a heat treatment (a post bake) at a temperature of 100 to 280° C. for a predetermined period using a heating device such as a hotplate or an oven, any volatile components within the colored coating film are removed, while any residual unreacted photocurable compound remaining within the cured colored film of the photocurable composition undergoes heat curing, thus completing production of the color filter.

The photocurable composition used for forming the color filter blue pixel portion includes the coloring powder composition of the present invention and a photocurable compound as essential components, may also include an organic solvent, a dispersant and a thermoplastic resin if required, and can be prepared by mixing these components together. In those cases where the blue resin coating film that forms the blue pixel portion requires the toughness and the like necessary to withstand the baking and the like performed during actual production of the color filter, the photocurable composition must include not only the photocurable compound, but also a thermoplastic resin. When a thermoplastic resin is included in the composition, an organic solvent capable of dissolving this thermoplastic resin is also preferably used.

In a typical method of producing the photocurable composition, the coloring powder composition of the present invention is combined with an organic solvent and a dispersant as required, these components are stirred and dispersed to achieve a uniform mixture, thereby first preparing a pigment dispersion for forming the blue pixel portion of a color filter. To this pigment dispersion is added the photocurable compound and, if required, a thermoplastic resin and a photopolymerization initiator and the like, thereby completing formation of the photocurable composition.

Examples of the dispersant include DisperBYK 130, 161, 162, 163 and 170, manufactured by BYK Chemie GmbH, and EFKA46 and EFKA47 manufactured by EFKA Additives, Inc. Furthermore, leveling agents, coupling agents and any of the various surfactants or the like may also be used in combination.

As the organic solvent, polar solvents that are water-soluble, including propionate solvents, alcohol-based solvents, ether-based solvents, ketone-based solvents, nitrogen compound-based solvents and lactone-based solvents are preferred, and specific examples include the organic solvents exemplified above. Further, when a water-soluble organic solvent is used, water may be used in combination with the organic solvent.

Examples of the thermoplastic resin that may be used in preparing the photocurable composition include urethane resins, acrylic resins, polyamide resins, polyimide resins, styrene-maleic acid resins, and styrene-maleic anhydride resins.

Examples of the photocurable compound include difunctional monomers such as 1,6-hexanediol diacrylate, ethylene glycol diacrylate, neopentyl glycol diacrylate, triethylene glycol diacrylate, bis(acryloxyethoxy)bisphenol A and 3-methylpentanediol diacrylate, polyfunctional monomers of comparatively low molecular weight such as trimethylolpropane triacrylate, pentaerythritol triacrylate, tris(2-hydroxyethyl)isocyanate, dipentaerythritol hexaacrylate and dipentaerythritol pentaacrylate, and polyfunctional monomers of comparatively large molecular weight such as polyester acrylates, polyurethane acrylates and polyether acrylates.

Examples of the photopolymerization initiator include acetophenone, benzophenone, benzyldimethylketanol, benzoyl peroxide, 2-chlorothioxanthone, 1,3-bis(4'-azidobenzal)-2-propane, 1,3-bis(4-azidobenzal)-2-propane-2'-sulfonic acid and 4,4'-diazidostilbene-2,2'-disulfonic acid.

Using each of the materials described above, and with the following blend amounts reported as parts by mass, the aforementioned pigment dispersion can be obtained by combining 100 parts of the coloring powder composition produced in accordance with the present invention with 300 to 1,000 parts of the organic solvent and, if required, 1 to 100 parts of the dispersant, and then stirring the resulting mixture until a uniform dispersion is obtained. To this pigment dispersion are added a total of 3 to 20 parts of the thermoplastic resin and the photocurable compound per 1 part of the coloring powder composition of the present invention, if required 0.05 to 3 parts of the photopolymerization initiator per 1 part of the photocurable compound, and if required a further amount of the organic solvent, and the resulting mixture is then stirred until a uniform dispersion is obtained, thus yielding the photocurable composition for forming the color filter blue pixel portion.

A conventional organic solvent or an alkali aqueous solution can be used as the developing liquid. In those cases where the photocurable composition includes a thermoplastic resin or a photocurable compound, and at least one of these has an acid number and exhibits alkali solubility, washing with an alkali aqueous solution can be effective in forming the color filter blue pixel portion.

Of the various pigment dispersion methods, a method of producing the color filter blue pixel portion using a photolithography method has been described above in detail, but the color filter blue pixel portion prepared using the coloring powder composition produced in accordance with the present invention may also be formed using a different method such as an electrodeposition method, transfer method, micelle electrolytic method, Photovoltaic Electrodeposition (PVED) method, inkjet method, reverse printing method or heat-curing method, and subsequently used to produce a color filter.

The color filter can be obtained by a method using photocurable compositions of each of the colors, prepared using a red pigment, a green pigment and the coloring powder composition produced in accordance with the present invention, wherein a liquid crystal material is injected between a pair of parallel transparent electrodes, the transparent electrodes are divided into very fine non-continuous sections, and fine sections that have been compartmentalized in a lattice shape on top of the transparent electrodes by a black matrix are filled with one of the colors red, green or blue, so that colored pixel portions are provided in an alternating pattern on top of the electrode. Alternatively, the color filter may also be obtained by a method in which the color filter colored pixel portions are first formed on a substrate, and the transparent electrodes are then provided.

The coloring powder composition for the blue pixel portion of a color filter produced in accordance with the present invention is a blue composition having a slightly red hue that exhibits excellent sharpness and brightness, and superior storage stability and heat resistance. Besides color filter applications, the coloring powder composition may also be used for coloring paints, plastics (resin molded items), printing inks, rubbers, leather, prints, electrostatic image developing toners, inkjet recording inks and thermal transfer inks.

EXAMPLES

The present invention is described in more detail below, based on a series of examples, although the scope of the present invention is in no way limited by these examples. Unless stated otherwise, the units "parts" and "%" refer to mass-referenced values.

(Evaluation Methods)

Each of the evaluation methods employed in the examples of the present invention is described below.

1) Viscosity. The viscosity was measured using a RE550L viscometer manufactured by Told Sangyo Co., Ltd. Lower viscosity values were evaluated as being more favorable.

2) Brightness. Using a microscope MX-50 manufactured by Olympus Corporation and a spectrophotometer MCPD-3000 manufactured by Otsuka Electronics Co., Ltd., the Y value of the CIE color system chromaticity coordinates was measured using an F10 light source. Higher brightness values were evaluated as being more favorable.

3) Contrast. The color filter blue pixel portion was sandwiched between two polarizing plates, and brightness values were measured with a light source installed on one of the polarizing plates and a luminance colorimeter installed on the opposing polarizing plate. The contrast was calculated from the ratio between the brightness value (transmitted light intensity) when the polarizing axes were parallel and the brightness value when the two polarization axes were perpendicular. Higher contrast values were evaluated as being more favorable.

4) Transmittance haze. The transmittance haze was measured in accordance with JIS K 7136, using a Haze-Guard Dual meter manufactured by BYK-Gardner. Lower transmittance haze values were evaluated as being more favorable.

5) Measurement of amine value. 500 mg of the synthesized dioxazine sulfamoyl compound was weighed, and sufficient methanol was added to bring the mass of the mixture to 30 g. Following complete dissolution using ultrasonic irradiation, a potentiometric titration was performed with 0.1 N hydrochloric acid (manufactured by Kanto Chemical Co., Inc.), and the amine value was calculated.

Production Example 1

Synthesis of Dioxazine Sulfamoyl Compound (3)

A three-neck flask was charged with 17.5 parts of chlorosulfonic acid, and with the flask cooled to a temperature of not more than 10° C., 2.0 parts of dioxazine violet (C.I. Pigment Violet 23) was added. The chlorosulfonation reaction was left to proceed for 3 hours at 10° C., and the reaction liquid was then poured into a beaker containing 200 parts of ice water. The resulting mixture was filtered and then washed with 20 parts of ice water. The thus obtained paste was transferred to a beaker, 100 parts of water at a temperature of not more than 10° C. was added, and the mixture was stirred and dispersed. To the resulting dispersion were added 20.3 parts of Surfonamine B-200 manufactured by Huntsman Corporation, U.S.A. (a primary amine-terminated poly(ethylene oxide/propylene oxide) (5/95) copolymer having a number average molecular weight of approximately 2,000) as a polyether monoamine and 0.72 parts of sodium carbonate, the resulting mixture was stirred at 5 to 10° C. for one hour, subsequently stirred overnight at room temperature, and finally stirred at 80° C. for 30 minutes. The obtained reaction liquid was poured into 1,000 parts of water, the resulting mixture was extracted into chloroform, and the chloroform layer was then washed with water and dried over anhydrous sodium sulfate. Subsequently, the chloroform solution was filtered, and the solvent was removed by distillation under reduced pressure, yielding the dioxazine sulfamoyl compound (3) ($R=C_2H_5$, m=0, n=2). The amine value for this dioxazine sulfamoyl compound (3) was 8.0. The UV and IR spectra for the dioxazine sulfamoyl compound (3) are illustrated in FIG. 1 and FIG. 2 respectively.

Production Example 2

Synthesis of Dioxazine Sulfamoyl Compound (6)

With the exceptions of replacing the 20.3 parts of the Surfonamine B-200 from production example 1 with 14.9 parts of Jeffamine M2070 manufactured by Huntsman Corporation, U.S.A. (a primary amine-terminated poly(ethylene oxide/propylene oxide) (70/30) copolymer having a number average molecular weight of approximately 2,000), and altering the amount of sodium carbonate from 0.72 parts to 0.90 parts, reaction was conducted in the same manner as production example 1. The obtained reaction liquid was poured into 600 parts of a half-saturated saline solution, and the resulting mixture was extracted into chloroform. The chloroform layer was then washed with a half-saturated saline solution and dried over anhydrous sodium sulfate. Subsequently, the chloroform solution was filtered, and the solvent was removed by distillation under reduced pressure, yielding the dioxazine sulfamoyl compound (6) (R=C$_2$H$_5$, m=0, n=2). The UV and IR spectra for the dioxazine sulfamoyl compound (6) are illustrated in FIG. 3 and FIG. 4 respectively.

[Chemical Formula 12]

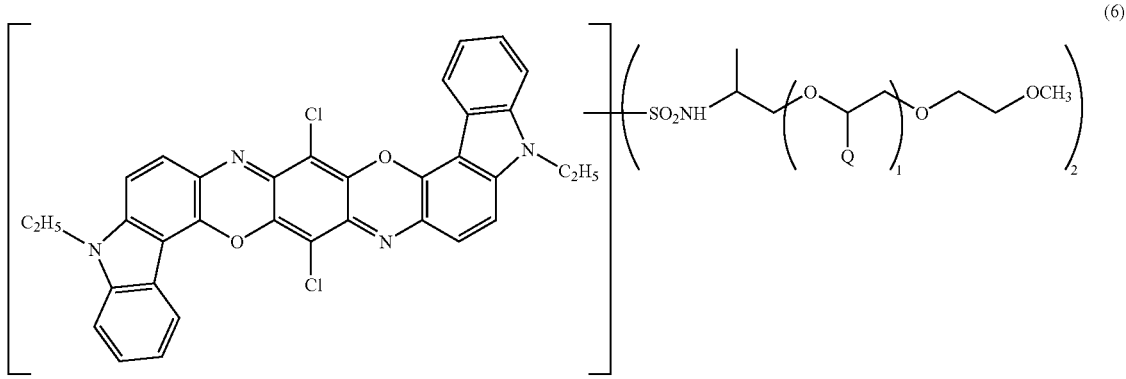

(6)

wherein Q represents a hydrogen atom or a methyl group, and l has an average value of 41.

Furthermore, polyether monoamines that are not available commercially can be synthesized, for example, using the method outlined below.

[Chemical Formula 13]

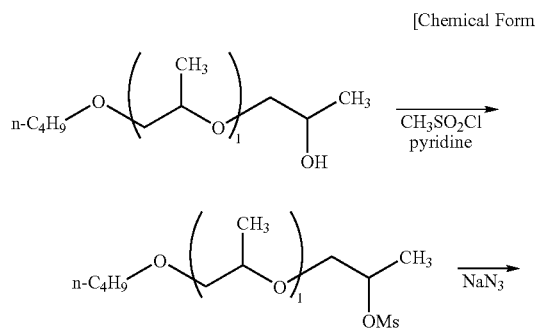

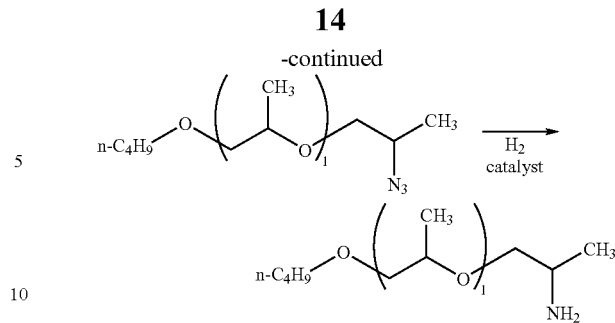

Namely, the hydroxyl group of a polyoxypropylene monoalkyl ether was converted to a sulfonate ester such as a mesylate (abbreviated as MsO) or a tosylate, the ester was azidated via a substitution reaction using sodium azide or the like, and a reduction was then performed to obtain the target polyether monoamine.

Production Example 3

Synthesis of Dioxazine Sulfamoyl Compound (7)

10 parts of a polyoxypropylene monobutyl ether (Unilub MB-19, manufactured by NOF Corporation, average polymerization degree: 24, average molecular weight: 1,300) was dissolved in 53 parts of dichloromethane, and with the solution undergoing constant stirring, 5.3 parts of pyridine and 1.0 parts of methanesulfonyl chloride were added, and the resulting mixture was then stirred at room temperature for 3 hours. An additional 0.80 parts of methanesulfonyl chloride was then added, and stirring was continued overnight. The resulting reaction mixture was diluted with ethyl acetate, washed sequentially with dilute hydrochloric acid, a saturated solution of sodium bicarbonate and a saturated saline solution, and was then dried over anhydrous magnesium sulfate. The drying agent was removed by filtration, the solution was concentrated under reduced pressure, and the resulting residue was purified by silica gel column chromatography (eluent: chloroform/ethanol), yielding 9.0 parts of a mesylate product.

4.8 parts of the thus obtained mesylate product and 0.41 parts of sodium azide were dissolved in 28 parts of DMSO, and the resulting mixture was stirred overnight at 80° C. The reaction liquid was then poured into water, and extracted into ethyl acetate. The organic layer was washed sequentially with water and a saturated saline solution, and was then dried over anhydrous magnesium sulfate. The drying agent was removed by filtration, the solution was concentrated under reduced pressure, and the resulting residue was purified by silica gel column chromatography (eluent: chloroform/methanol), yielding 4.15 parts of an azide product.

7.6 parts of the obtained azide product was dissolved in 55 parts of ethanol, 0.4 parts of 5% Pd—C was added, and a normal-pressure contact hydrogenation was conducted under a hydrogen atmosphere at 40° C. After stirring for 4 hours, the reaction liquid was filtered to remove the catalyst, and the filtrate was concentrated under reduced pressure, yielding 7.1 parts of the target polyether monoamine.

With the exception of replacing the 20.3 parts of Surfonamine B-200 used in production example 1 with 13.2 parts of the polyether monoamine synthesized using the above method, a dioxazine sulfamoyl compound (7) ($R=C_2H_5$, $m=0$, $n=2$) was obtained in the same manner as production example 1. The UV and IR spectra for the obtained dioxazine sulfamoyl compound (7) are illustrated in FIG. 5 and FIG. 6 respectively.

[Chemical Formula 14]

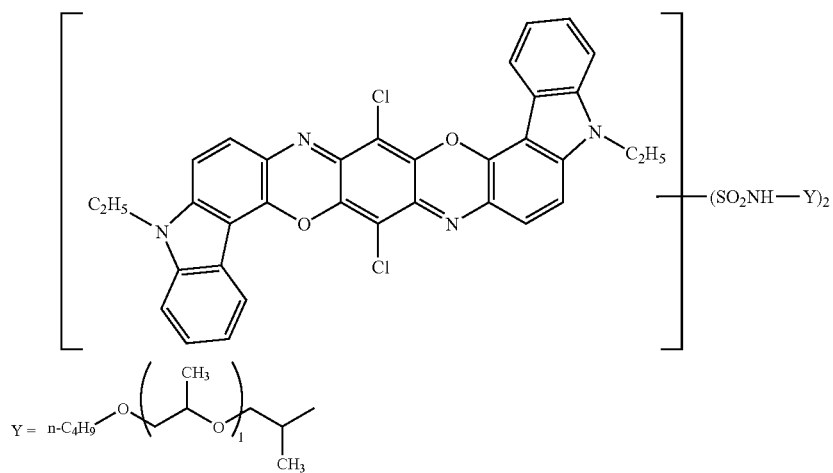

wherein l has an average value of 23.

Production Example 4

Synthesis of Dioxazine Sulfamoyl Compound (8)

Using the same method as production example 3, a polyether monoamine was synthesized from a polyoxypropylene monobutyl ether (Unilub MB-38, manufactured by NOF Corporation, average polymerization degree: 33, average molecular weight: 1,900).

With the exception of replacing the 20.3 parts of Surfonamine B-200 used in production example 1 with 17.4 parts of the polyether monoamine synthesized using the above method, a dioxazine sulfamoyl compound (8) ($R=C_2H_5$, $m=0$, $n=2$) was obtained in the same manner as production example 1. The UV and IR spectra for the obtained dioxazine sulfamoyl compound (8) are illustrated in FIG. 7 and FIG. 8 respectively.

[Chemical Formula 15]

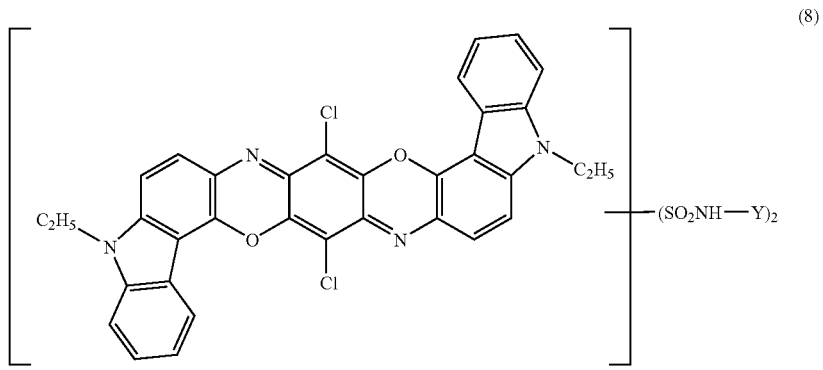

-continued

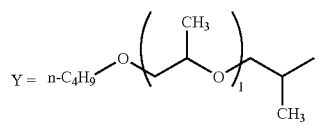

wherein l has an average value of 32.

Examples and comparative examples relating to the synthesis of novel dioxazine sulfamoyl compounds, the preparation of dispersions, and the evaluation of color filters formed using the dispersion are presented below.

Example 1

Synthesis of Dioxazine Sulfamoyl Compound (5)

With the exceptions of altering the amount of Surfonamine B-200 from production example 1 from 20.3 parts to 13.6 parts, and altering the amount of sodium carbonate from 0.72 parts to 0 parts, a dioxazine sulfamoyl compound (5) (R=$C_2H_5$, m=1, n=1) was obtained in the same manner as production example 1. The amine value for this dioxazine sulfamoyl compound (5) was 20.1.

[Chemical Formula 16]

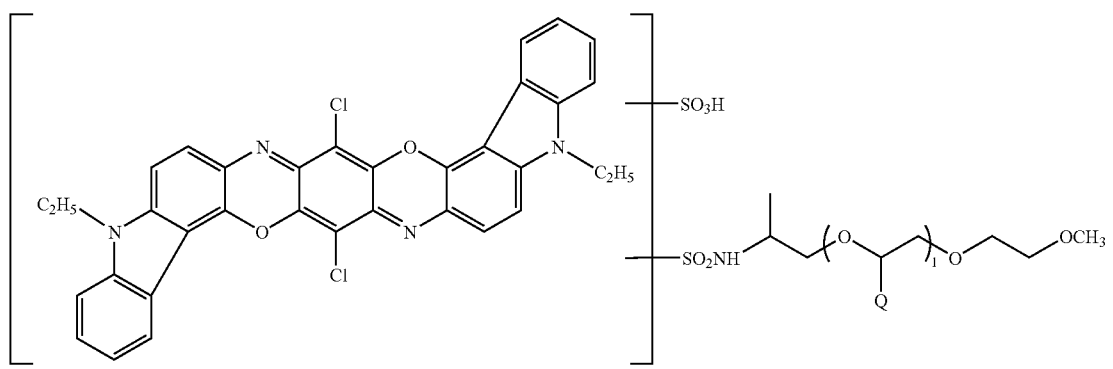

(5)

wherein Q represents a hydrogen atom or a methyl group, and l has an average value of 35.

Example 2

10 parts of a dioxazine violet pigment (C.I. Pigment Violet 23) was placed in a plastic bottle, 53 parts of propylene glycol monomethyl ether acetate, 4 parts of the dioxazine sulfamoyl compound (3) obtained in the above production example 1 and 0.3 mmΦ SEPR beads were added to the bottle, and the resulting mixture was dispersed for 3 hours using a paint conditioner (manufactured by Toyo Seiki Co., Ltd.), thus yielding a pigment dispersion. The viscosity of the pigment dispersion, measured at 20° C. and 10 rpm using a RE550L viscometer manufactured by Told Sangyo Co., Ltd., was 10 mPa·s. 75.00 parts of this pigment dispersion, 5.50 parts of a polyester acrylate resin (ARONIX (a registered trademark) M7100, manufactured by Toagosei Co., Ltd.), 5.00 parts of dipentaerythritol hexaacrylate (KAYARAD (a registered trademark) DPHA, manufactured by Nippon Kayaku Co., Ltd.), 1.00 parts of benzophenone (KAYACURE (a registered trademark) BP-100, manufactured by Nippon Kayaku Co., Ltd.) and 13.5 parts of UCAR ester EEP were mixed together in a dispersion mixer, and the resulting mixture was then filtered through a filter having a pore size of 1.0 μm, thus yielding a color resist. Using a spin coater, this color resist was applied to a 1 mm thick glass sheet of 50 mm×50 mm in sufficient amount to generate a dried film thickness of 2 μm, and the resist was then subjected to preliminary drying at 90° C. for 20 minutes, thus forming a coating film.

Subsequently, pattern exposure was performed with ultraviolet light through a photomask, and the unexposed portions were removed by washing with a 0.5% aqueous solution of sodium carbonate, yielding a color filter.

Example 3

10 parts of the dioxazine violet pigment was placed in a plastic bottle, 53 parts of propylene glycol monomethyl ether acetate, 3 parts of the dioxazine sulfamoyl compound (5) obtained in the above example 1 and 0.3 mmΦ SEPR beads were added to the bottle, and the resulting mixture was dispersed for 3 hours using a paint conditioner (manufactured by Toyo Seiki Co., Ltd.), thus yielding a pigment dispersion. The viscosity of the pigment dispersion, measured at 20° C. and 1 rpm, was 300 mPa·s.

Example 4

With the exception of replacing the 4 parts of the dioxazine sulfamoyl compound (3) from example 2 with 4 parts of the dioxazine sulfamoyl compound (3) and 0.5 parts of a dioxazine violet sulfonic acid (sulfonation degree=2), dispersion for 3 hours using a paint conditioner was conducted in the same manner as example 2, yielding a pigment dispersion. The viscosity of the pigment dispersion, measured at 20° C. and 10 rpm, was 7 mPa·s.

Example 5

With the exception of replacing the 4 parts of the dioxazine sulfamoyl compound (3) from example 2 with 6 parts of the dioxazine sulfamoyl compound (6) obtained in the above production example 2, dispersion for 3 hours using a paint conditioner was conducted in the same manner as example 2, yielding a pigment dispersion. The viscosity of the pigment dispersion, measured at 20° C. and 10 rpm, was 6 mPa·s.

Example 6

With the exception of replacing the 4 parts of the dioxazine sulfamoyl compound (3) from example 2 with 6 parts of the dioxazine sulfamoyl compound (7) obtained in the above production example 3, dispersion for 3 hours using a paint conditioner was conducted in the same manner as example 2, yielding a pigment dispersion. The viscosity of the pigment dispersion, measured at 20° C. and 10 rpm, was 7 mPa·s.

Example 7

With the exception of replacing the 4 parts of the dioxazine sulfamoyl compound (3) from example 2 with 6 parts of the dioxazine sulfamoyl compound (8) obtained in the above production example 4, dispersion for 3 hours using a paint conditioner was conducted in the same manner as example 2, yielding a pigment dispersion. The viscosity of the pigment dispersion, measured at 20° C. and 10 rpm, was 17 mPa·s.

Example 8

With the exception of replacing the 10 parts of the dioxazine violet pigment (C.I. Pigment Violet 23), the 53 parts of propylene glycol monomethyl ether acetate and the 3 parts of the dioxazine sulfamoyl compound (5) from example 1 that were used in example 3 with 10 parts of the dioxazine sulfamoyl compound (3) and 40 parts of propylene glycol monomethyl ether acetate, dispersion for 3 hours using a paint conditioner was conducted in the same manner as example 3, yielding a violet dispersion. The viscosity of the dispersion, measured at 20° C. and 10 rpm, was 7 mPa·s.

Next are descriptions of examples and comparative examples relating to the preparation of dispersions obtained by altering the hue of blue dispersions using violet dispersions, and the evaluation of color filters formed using these dispersions.

Example 9

9 parts of an ε-type copper phthalocyanine pigment (C.I. Pigment Blue 15:6) and 1 part of the dioxazine violet pigment were placed in a plastic bottle, 53 parts of propylene glycol monomethyl ether acetate, 2.7 parts of a copper phthalocyanine sulfamoyl compound represented by formula (9) below:

[Chemical Formula 17]

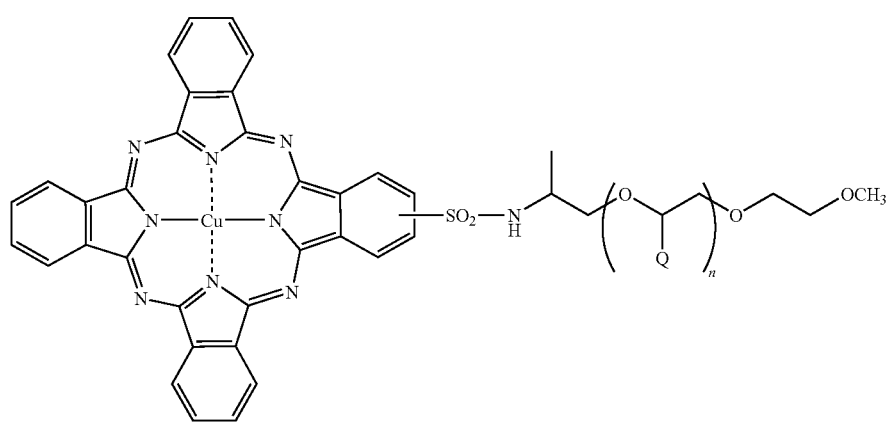

(9)

wherein Q represents a hydrogen atom or a methyl group and n has an average value of 35, 0.4 parts of the above dioxazine sulfamoyl compound (3), and 0.3 mmΦ SEPR beads were added to the bottle, and the resulting mixture was dispersed for 3 hours using a paint conditioner (manufactured by Toyo Seiki Co., Ltd.), thus yielding a pigment dispersion. The viscosity of the pigment dispersion, measured at 20° C. and 10 rpm using a RE550L viscometer manufactured by Told Sangyo Co., Ltd., was 5 mPa·s. 75.00 parts of this pigment dispersion, 5.50 parts of a polyester acrylate resin (ARONIX (a registered trademark) M7100, manufactured by Toagosei Co., Ltd.), 5.00 parts of dipentaerythritol hexaacrylate (KAYARAD (a registered trademark) DPHA, manufactured by Nippon Kayaku Co., Ltd.), 1.00 parts of benzophenone (KAYACURE (a registered trademark) BP-100, manufactured by Nippon Kayaku Co., Ltd.) and 13.5 parts of UCAR ester EEP were mixed together in a dispersion mixer, and the resulting mixture was then filtered through a filter having a pore size of 1.0 μm, thus yielding a color resist. Using a spin coater, this color resist was applied to a 1 mm thick glass sheet of 50 mm×50 mm in sufficient amount to generate a dried film thickness of 2 μm, and the resist was then subjected to preliminary drying at 90° C. for 20 minutes, thus forming a coating film. Subsequently, pattern exposure was performed with ultraviolet light through a photomask, and the unexposed portions were removed by washing with a 0.5% aqueous solution of sodium carbonate, yielding a color filter.

Example 10

10 parts of an ε-type copper phthalocyanine pigment (C.I. Pigment Blue 15:6) was placed in a plastic bottle, 53 parts of propylene glycol monomethyl ether acetate and 3.0 parts of the copper phthalocyanine sulfamoyl compound represented by the above formula (9) were added, and the resulting mixture was dispersed for 3 hours using a paint conditioner (manufactured by Toyo Seiki Co., Ltd.), thus yielding a pigment dispersion. The viscosity of the pigment dispersion, measured at 20° C. and 10 rpm using a RE550L viscometer manufactured by Told Sangyo Co., Ltd., was 5 mPa·s. This blue dispersion and the violet dispersion from production example 1 were each stored for one month at 20° C., and subsequent re-measurement of the respective viscosity values under the same conditions revealed results of 5 mPa·s and 10 mPa·s respectively, indicating no change in the viscosity in either case. Subsequently, 67.5 parts of the blue dispersion that had been stored for one month and 7.50 parts of the ultraviolet pigment dispersion from example 2 were mixed and used to produce a color filter in the same manner as example 3.

Example 11

With the exception of replacing the 1 part of the dioxazine violet pigment from example 9 with 10 parts of the dioxazine sulfamoyl compound (3), dispersion for 3 hours using a paint conditioner was conducted in the same manner as example 9, yielding a pigment dispersion. The viscosity of the pigment dispersion, measured at 20° C. and 10 rpm using a RE550L viscometer manufactured by Told Sangyo Co., Ltd., was 9 mPa·s.

Using this pigment dispersion, a color filter was produced in the same manner as example 9.

Example 12

With the exceptions of altering the amount of the dioxazine violet pigment from example 9 from 1 part to 0.06 parts, and altering the amount of the dioxazine sulfamoyl compound (3) from 0.4 parts to 0.03 parts, dispersion for 3 hours using a paint conditioner was conducted in the same manner as example 9, yielding a pigment dispersion. The viscosity of the pigment dispersion, measured at 20° C. and 10 rpm using a RE550L viscometer manufactured by Told Sangyo Co., Ltd., was 8 mPa·s.

Using this pigment dispersion, a color filter was produced in the same manner as example 9.

Example 13

9 parts of an s-type copper phthalocyanine pigment (C.I. Pigment Blue 15:6), 1 part of the dioxazine violet pigment, 2.7 parts of a copper phthalocyanine sulfamoyl compound represented by formula (9) below:

[Chemical Formula 18]

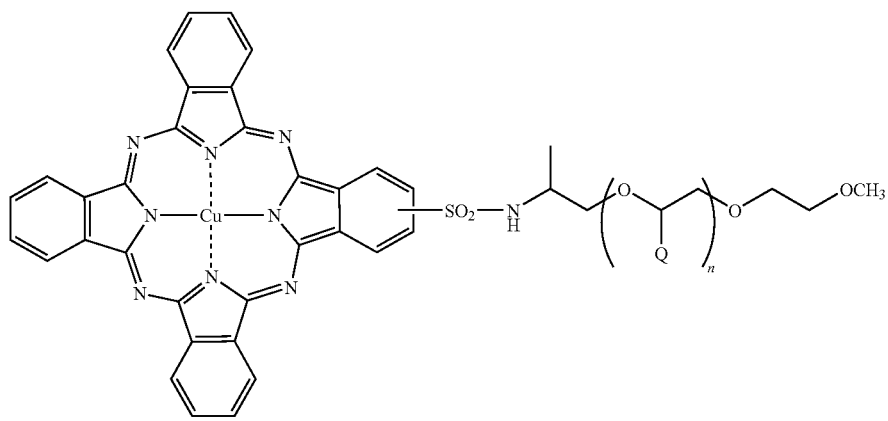

(9)

wherein Q represents a hydrogen atom or a methyl group and n has an average value of 35, and 0.4 parts of the dioxazine sulfamoyl compound (3) were mixed together in a kneader, thus yielding a coloring powder composition for a color filter. 13.1 parts of this coloring powder composition, 53 parts of propylene glycol monomethyl ether acetate, and 0.3 mmΦ SEPR beads were combined, and the resulting mixture was dispersed for 3 hours using a paint conditioner (manufactured by Toyo Seiki Co., Ltd.), thus yielding a pigment dispersion. The viscosity of the pigment dispersion, measured at 20° C. and 10 rpm using a RE550L viscometer manufactured by Told Sangyo Co., Ltd., was 5 mPa·s. Using this pigment dispersion, a color filter was produced in the same manner as example 9.

Example 14

10 parts of the dioxazine violet pigment and 4 parts of the above dioxazine sulfamoyl compound (3) were mixed in a kneader, yielding a violet coloring powder composition for a color filter.

14 parts of the coloring powder composition for a color filter was placed in a plastic bottle, 53 parts of propylene glycol monomethyl ether acetate and 0.3 mmΦ SEPR beads were combined, and the resulting mixture was dispersed for 3 hours using a paint conditioner (manufactured by Toyo Seiki Co., Ltd.), thus yielding a pigment dispersion. The viscosity of the pigment dispersion, measured at 20° C. and 10 rpm using a RE550L viscometer manufactured by Told Sangyo Co., Ltd., was 10 mPa·s. Using this pigment dispersion, a color filter was produced in the same manner as example 2.

Comparative Example 1

With the exception of replacing the 4 parts of the dioxazine sulfamoyl compound (3) from example 2 with a mixture of 4 parts of a basic functional group-containing copolymer AJISPER (a registered trademark) PB-821 (manufactured by Ajinomoto Fine-Techno Co., Inc.) and 0.5 parts of a dioxazine violet sulfonic acid (sulfonation degree=2), dispersion for 3 hours using a paint conditioner was conducted in the same manner as example 2, yielding a pigment dispersion. The viscosity of the pigment dispersion, measured at 20° C. and 1 rpm, exceeded 700 mPa·s, and was not measurable.

Using the pigment dispersions obtained in examples 3 to 8, example 14, and comparative example 1, color filters were prepared in the same manner as example 1, and the brightness, contrast and transmittance haze were evaluated for each color filter.

Comparative Example 2

With the exception of replacing the 2.7 parts of the copper phthalocyanine sulfamoyl compound and the 0.4 parts of the dioxazine sulfamoyl compound (3) from example 9 with 3.1 parts of the basic functional group-containing copolymer AJISPER (a registered trademark) PB-821 (manufactured by Ajinomoto Fine-Techno Co., Inc.) and 0.05 parts of a dioxazine violet sulfonic acid (sulfonation degree=2), dispersion for 3 hours using a paint conditioner was conducted in the same manner as example 9, yielding a pigment dispersion. The viscosity of the pigment dispersion, measured at 20° C. and 1 rpm, exceeded 700 mPa·s, and was not measurable.

Comparative Example 3

With the exception of not adding the 0.4 parts of the dioxazine sulfamoyl compound (3) from example 9, dispersion for 3 hours using a paint conditioner was conducted in the same manner as example 9, yielding a pigment dispersion. The viscosity of the pigment dispersion, measured at 20° C. and 10 rpm, was 7 mPa·s.

Table 1 lists the organic pigments used in the examples of the present invention, and the mass % for each pigment (dioxazine sulfamoyl compound+violet organic pigment/blue organic pigment), whereas Table 2 summarizes the evaluation results for the color filters.

TABLE 1

|  | Dioxazine sulfamoyl compound (A) | Blue organic pigment (B) | Violet organic pigment (C) | Mass % |
|---|---|---|---|---|
| Example 2 | Compound (3) | — | Pigment Violet 23 | — |
| Example 3 | Compound (5) | — | Pigment Violet 23 | — |
| Example 4 | Compound (3) | — | Pigment Violet 23 | — |
| Example 5 | Compound (6) | — | Pigment Violet 23 | — |
| Example 6 | Compound (7) | — | Pigment Violet 23 | — |
| Example 7 | Compound (8) | — | Pigment Violet 23 | — |
| Example 8 | Compound (3) | — | — | — |
| Example 9 | Compound (3) | Pigment Blue 15:6 | Pigment Violet 23 | 15.6% |
| Example 10 | Compound (3) | Pigment Blue 15:6 | Pigment Violet 23 | 15.3% |
| Example 11 | Compound (3) | Pigment Blue 15:6 | — | 115.6% |
| Example 12 | Compound (3) | Pigment Blue 15:6 | Pigment Violet 23 | 1.0% |
| Example 13 | Compound (3) | Pigment Blue 15:6 | Pigment Violet 23 | 15.6% |
| Example 14 | Compound (3) | — | Pigment Violet 23 | — |

TABLE 2

|  | Dispersion viscosity (mPa·s) | Brightness | Contrast | Transmittance haze |
|---|---|---|---|---|
| Example 2 | 10 | 14.0 | 1550 | 0.68 |
| Example 3 | 300 | 12.5 | 700 | 1.20 |
| Example 4 | 7 | 14.6 | 1600 | 0.68 |
| Example 5 | 6 | 14.2 | 1400 | 0.73 |
| Example 6 | 7 | 14.0 | 1550 | 0.68 |
| Example 7 | 17 | 14.0 | 1550 | 0.68 |
| Example 8 | 7 | 14.6 | 2830 | 0.20 |
| Example 14 | 10 | 14.0 | 1550 | 0.68 |
| Comparative example 1 | >700 | 12.0 | 560 | 1.46 |

Table 3 summarizes the evaluation results for the color filters prepared using dispersions obtained by altering the hue of the blue dispersions using violet dispersions.

TABLE 3

|  | Dispersion viscosity (mPa·s) | Brightness | Contrast | Transmittance haze |
|---|---|---|---|---|
| Example 9 | 5 | 8.7 | 3400 | 0.10 |
| Example 10 | 5 | 8.7 | 3400 | 0.10 |
| Example 11 | 9 | 8.8 | 6140 | 0.05 |
| Example 12 | 8 | 8.3 | 6500 | 0.04 |
| Example 13 | 5 | 8.7 | 3400 | 0.10 |
| Comparative example 2 | >700 | 7.4 | 470 | 1.64 |
| Comparative example 3 | 7 | 8.3 | 3300 | 0.13 |

It was very clear that, even in those systems containing a blue organic pigment, color filters could be provided that exhibited significantly superior functions to those obtainable using conventional dispersants. Further, as shown in comparative example 3, it is evident that compared with copper phthalocyanine sulfamoyl compounds that functions as blue dispersants, the dioxazine sulfamoyl compound of the present invention is able to provide a color filter that exhibits superior functions.

From the results of the above examples and comparative examples it is clear that a color filter prepared using the dioxazine sulfamoyl compound obtained in accordance with the present invention combines superior levels of dispersion viscosity, brightness, contrast and transmittance haze.

Figure 1:
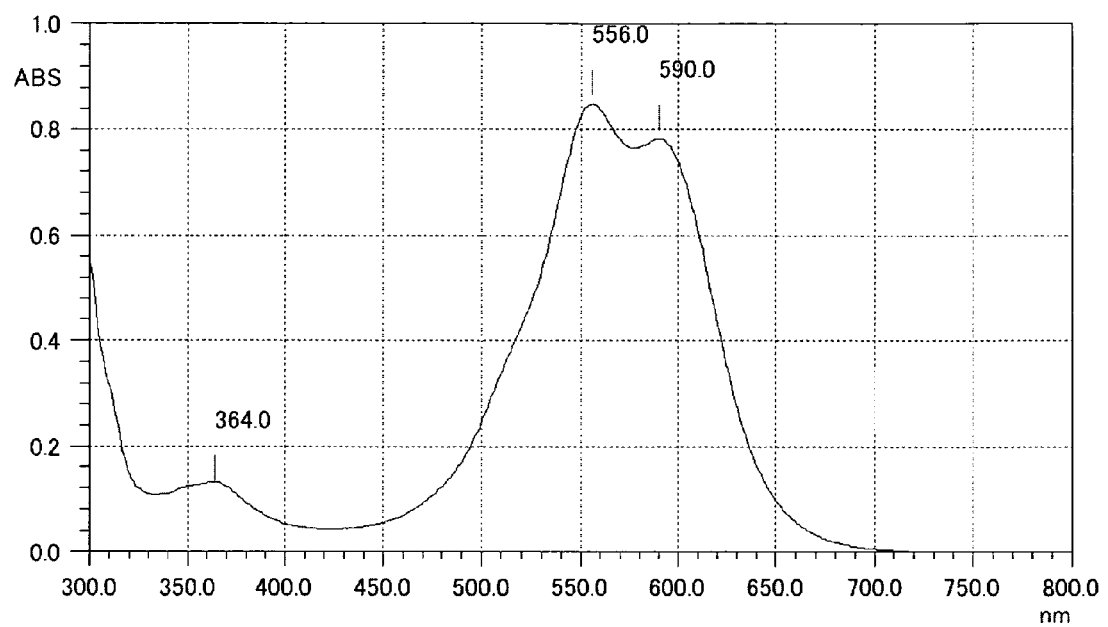
FIG. 1 is a UV spectrum of the dioxazine sulfamoyl compound (3) (124 mg/L within MeOH).
Figure 2:
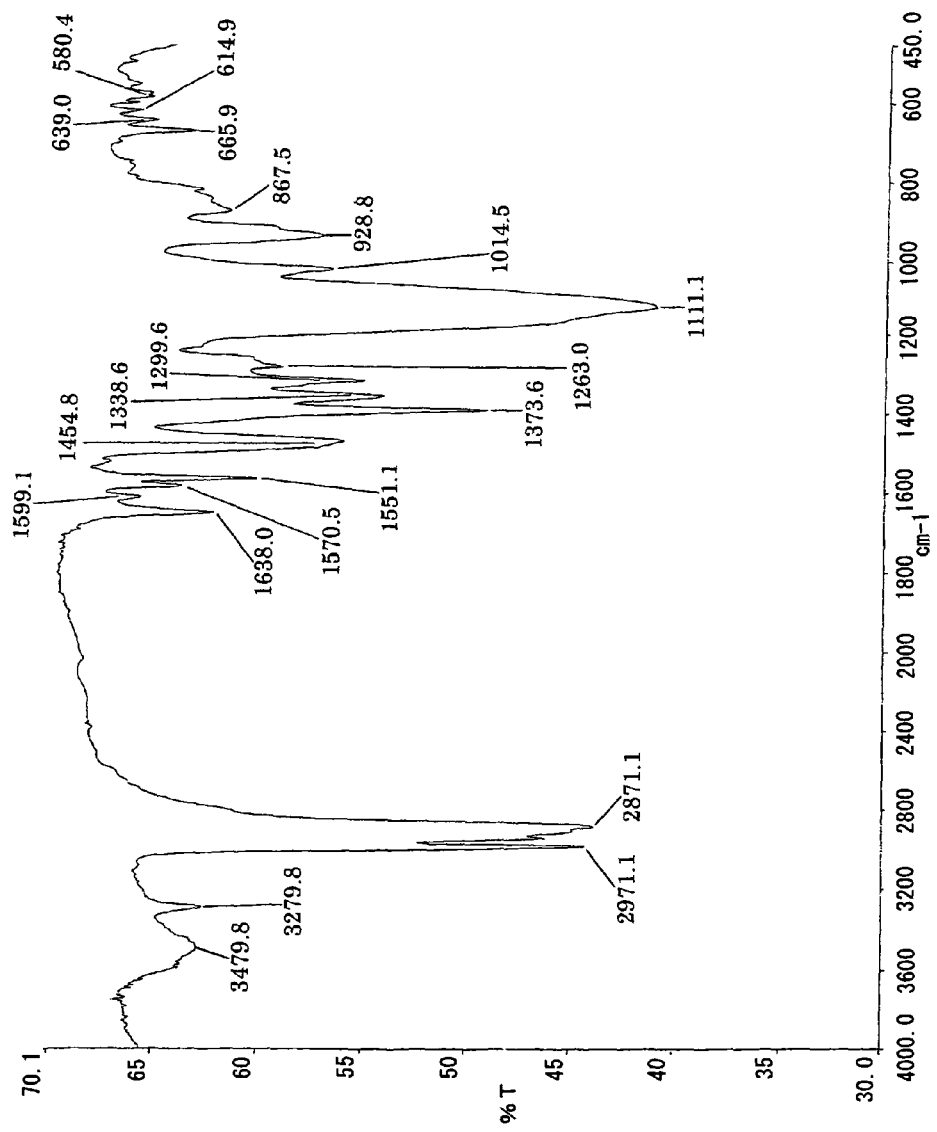
FIG. 2 is an IR spectrum of the dioxazine sulfamoyl compound (3) (using the KBr film method).
Figure 3:
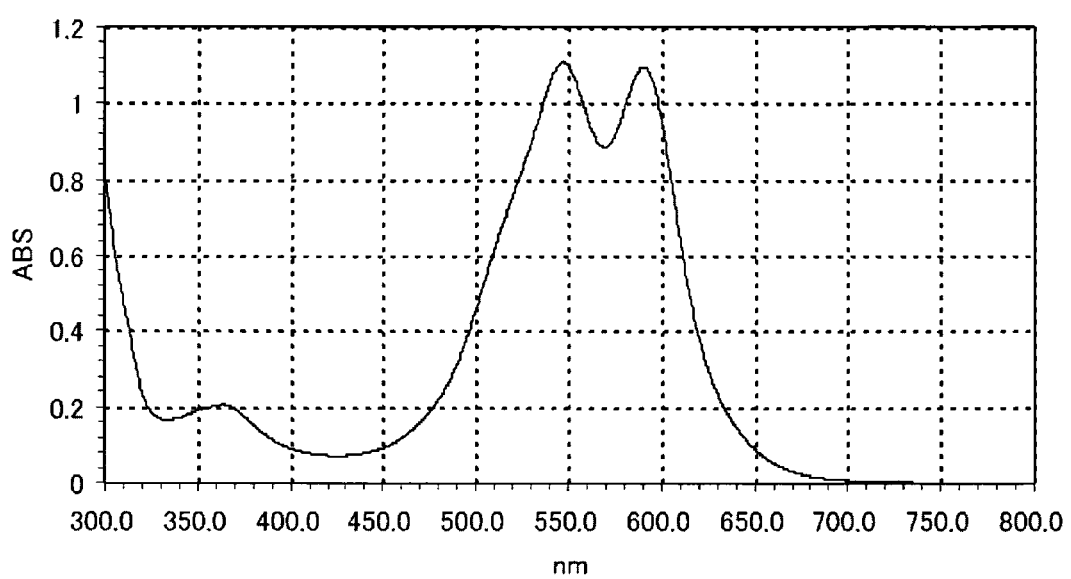
FIG. 3 is a UV spectrum of the dioxazine sulfamoyl compound (6) (140 mg/L within propylene glycol monomethyl ether acetate).
Figure 4:
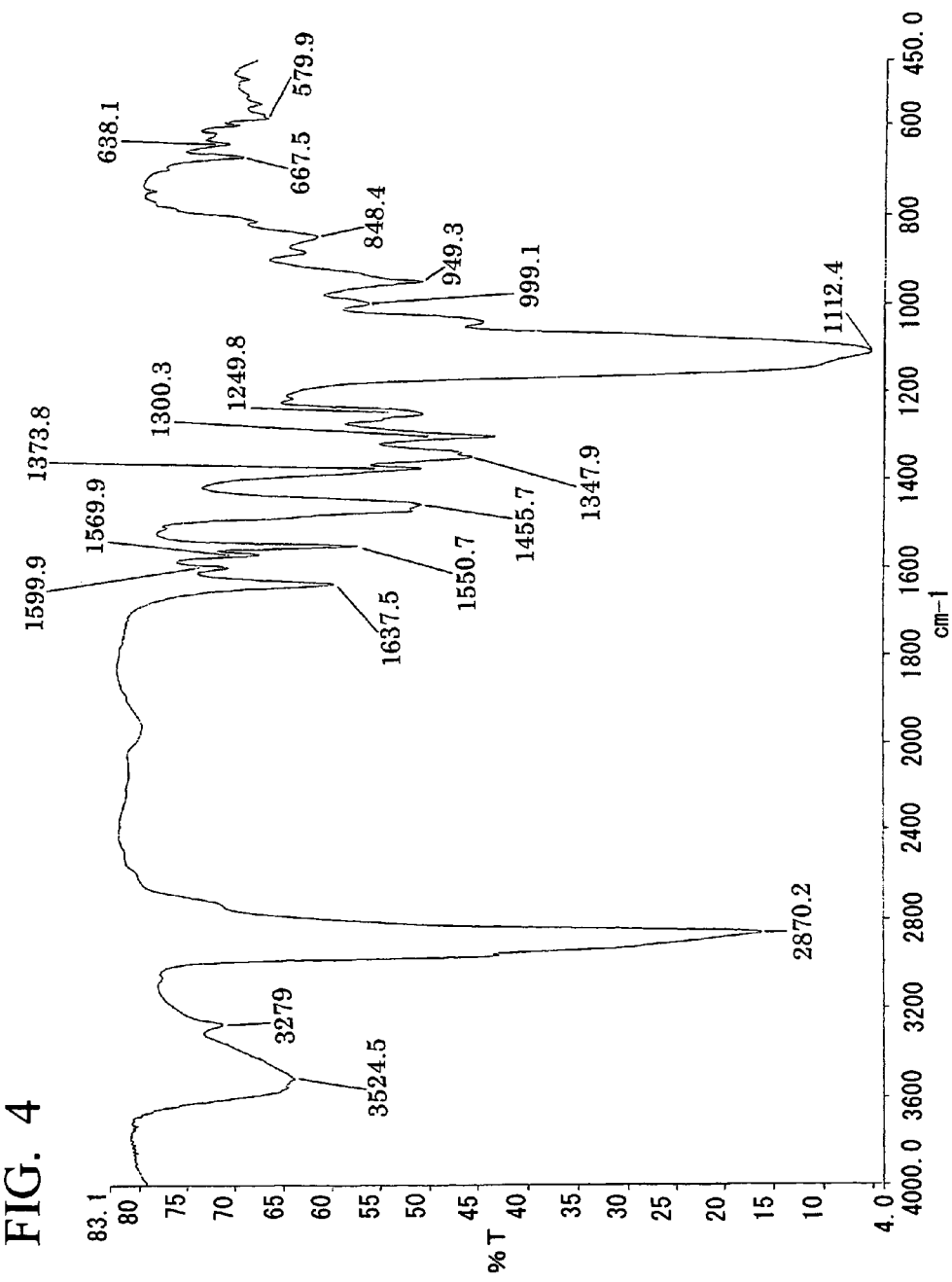
FIG. 4 is an IR spectrum of the dioxazine sulfamoyl compound (6) (using the KBr film method).
Figure 5:
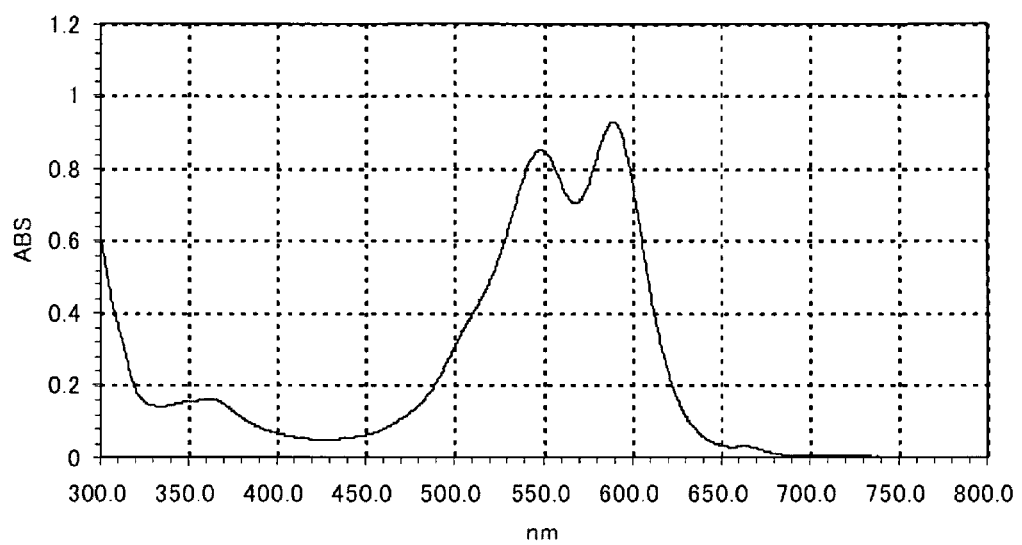
FIG. 5 is a UV spectrum of the dioxazine sulfamoyl compound (7) (65 mg/L within propylene glycol monomethyl ether acetate).
Figure 6:
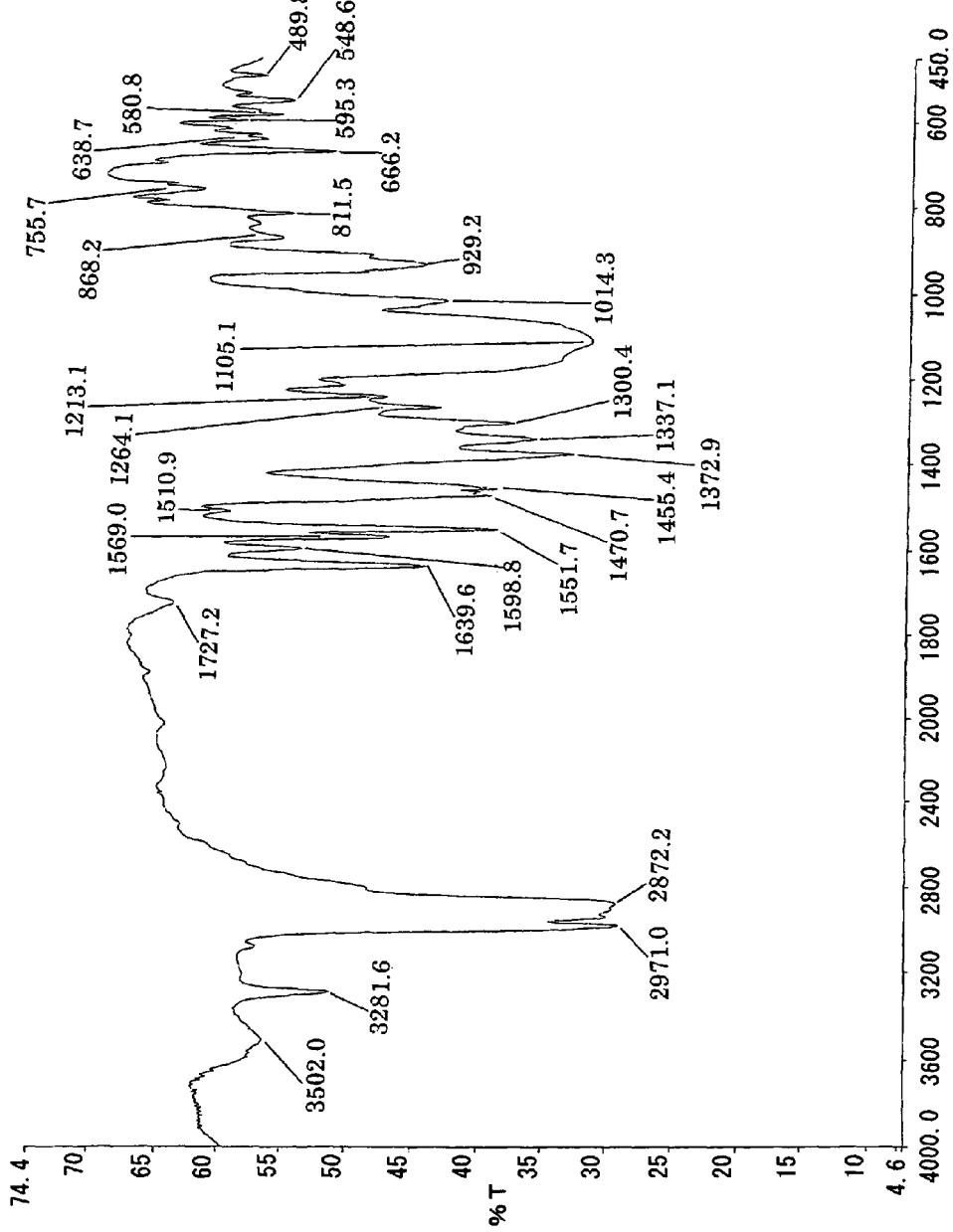
FIG. 6 is an IR spectrum of the dioxazine sulfamoyl compound (7) (using the KBr film method).
Figure 7:
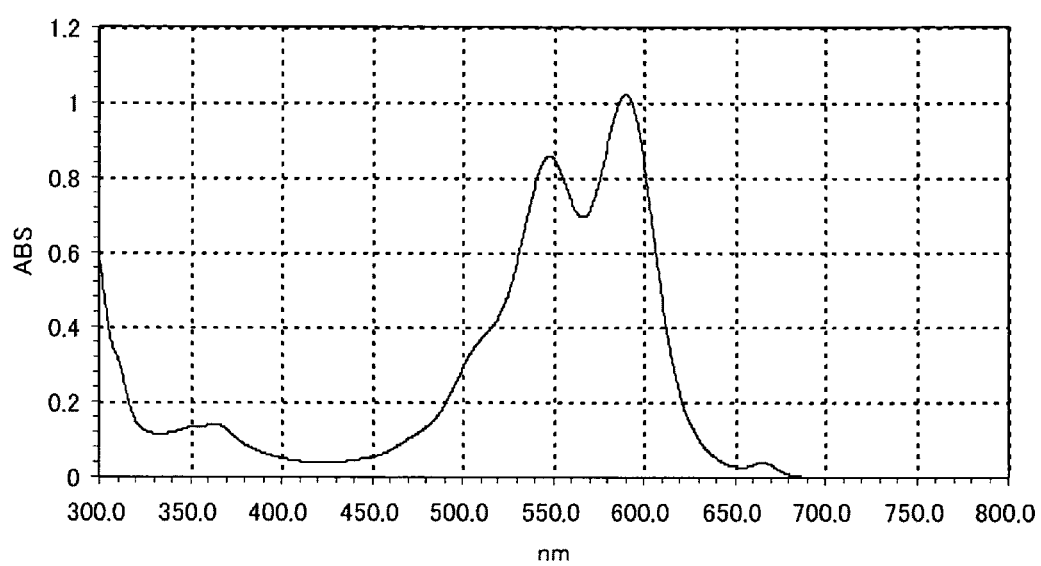
FIG. 7 is a UV spectrum of the dioxazine sulfamoyl compound (8) (89 mg/L within propylene glycol monomethyl ether acetate).
Figure 8:
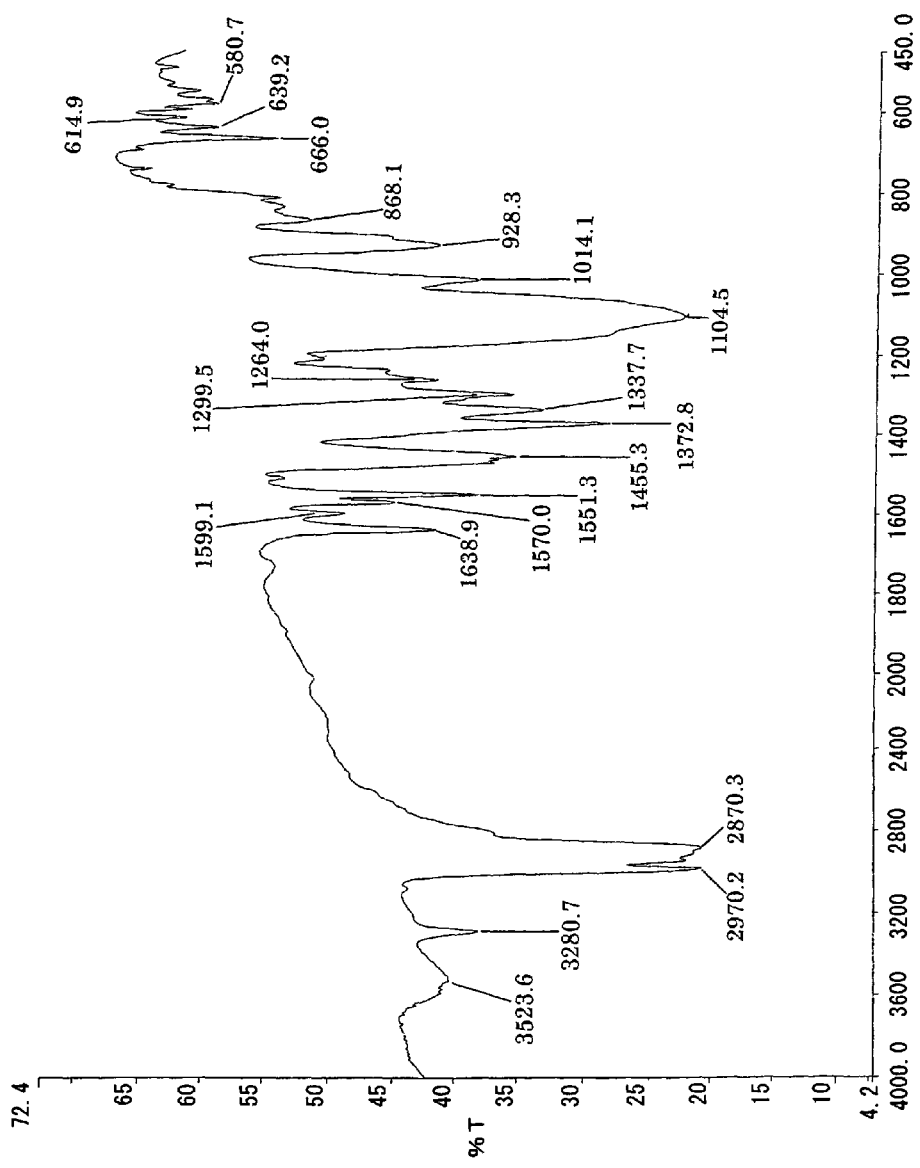
FIG. 8 is an IR spectrum of the dioxazine sulfamoyl compound (8) (using the KBr film method).

The invention claimed is:

1. A coloring powder composition for a blue pixel portion of a color filter, comprising:

a dioxazine sulfamoyl compound (A) represented by general formula (1) shown below:

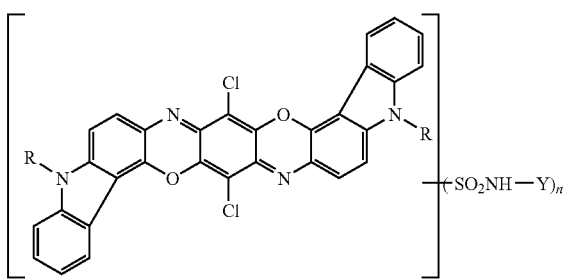

(1)

wherein R represents an alkyl group of 1 to 4 carbon atoms, n represents an integer of 1 to 4, and Y represents a group represented by general formula (2) shown below:

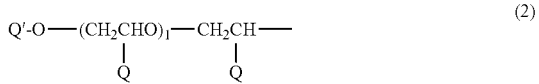

(2)

wherein l represents an integer of 4 to 100, each Q independently represents a hydrogen atom or a methyl group, and Q' represents an alkyl group of 1 to 6 carbon atoms; and a blue organic pigment (B), wherein an amount of the dioxazine sulfamoyl compound (A), relative to an amount of the blue organic pigment (B), is within a range from 1 to 115.6% by mass.

2. The coloring powder composition for the blue pixel portion of the color filter according to claim 1, further comprising a violet organic pigment (C), wherein a combined amount of the dioxazine sulfamoyl compound (A) and the violet organic pigment (C), relative to an amount of the blue organic pigment (B), is within a range from 0.1 to 15.6% by mass.

3. A pigment dispersion for a blue pixel portion of a color filter produced by dispersing the coloring powder composition for the color filter according to claim 2 within a medium.

4. The coloring powder composition for the blue pixel portion of the color filter according to claim 2, wherein the violet organic pigment (C) is a dioxazine.

5. A pigment dispersion for a blue pixel portion of a color filter produced by dispersing the coloring powder composition for the color filter according to claim 4 within a medium.

6. The coloring powder composition for the blue pixel portion of the color filter according to claim 1, wherein in the dioxazine sulfamoyl compound (A) represented by the general formula (1), R represents an ethyl group, and n represents 2.

7. A pigment dispersion for a blue pixel portion of a color filter produced by dispersing the coloring powder composition for the color filter according to claim 6 within a medium.

8. The coloring powder composition for the blue pixel portion of the color filter according to claim 1, wherein the blue organic pigment (B) is a phthalocyanine.

9. A pigment dispersion for a blue pixel portion of a color filter produced by dispersing the coloring powder composition for the color filter according to claim 8 within a medium.

10. The coloring powder composition for the blue pixel portion of the color filter according to claim 8, wherein the phthalocyanine is an ε phthalocyanine.

11. A pigment dispersion for a blue pixel portion of a color filter produced by dispersing the coloring powder composition for the color filter according to claim 10 within a medium.

12. The coloring powder composition for the blue pixel portion of the color filter according to claim 10, wherein the ε phthalocyanine is an ε copper phthalocyanine.

13. A pigment dispersion for a blue pixel portion of a color filter produced by dispersing the coloring powder composition for the color filter according to claim 12 within a medium.

14. A pigment dispersion for a blue pixel portion of a color filter produced by dispersing the coloring powder composition for a color filter according to claim 1 within a medium.

15. A color filter produced by using a pigment dispersion for a blue pixel portion of a color filter according to claim 14 within a blue pixel portion.

* * * * *